Figure 1:
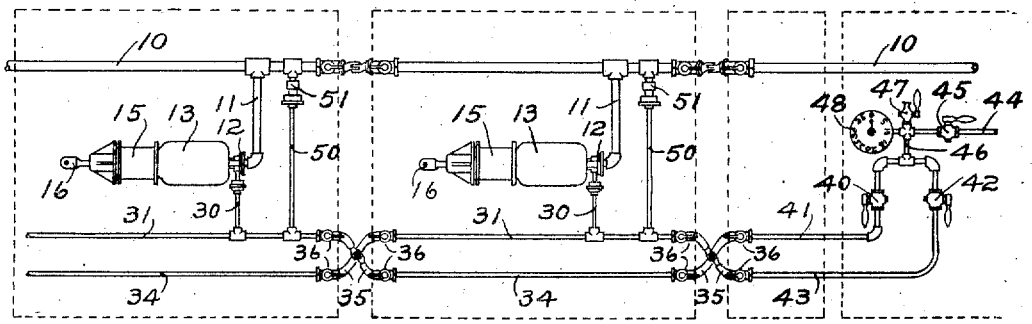

F. & T. R. KOSIER & T. BEMIS.
AIR BRAKE APPARATUS.
APPLICATION FILED FEB. 7, 1913.

1,114,152.

Patented Oct. 20, 1914.

WITNESSES:
A. H. Edgerton.
O. M. McLaughlin

INVENTORS
FRANK KOSIER,
THOMAS R. KOSIER
THOMAS BEMIS.
BY
V. H. Lockwood
ATTORNEY.

UNITED STATES PATENT OFFICE.

FRANK KOSIER AND THOMAS R. KOSIER, OF LUDLOW, KENTUCKY, AND THOMAS BEMIS, OF INDIANAPOLIS, INDIANA.

AIR-BRAKE APPARATUS.

1,114,152. Specification of Letters Patent. Patented Oct. 20, 1914.

Application filed February 7, 1913. Serial No. 746,722.

*To all whom it may concern:*

Be it known that we, FRANK KOSIER, THOMAS R. KOSIER, and THOMAS BEMIS, citizens of the United States, and the said FRANK KOSIER and THOMAS R. KOSIER being residents of Ludlow, county of Kenton, and State of Kentucky, and the said THOMAS BEMIS being a resident of Indianapolis, county of Marion, and State of Indiana, have invented a certain new and useful Air-Brake Apparatus; and we do hereby declare that the following is a full, clear, and exact description thereof, reference being had to the accompanying drawings, in which like letters refer to like parts.

One object of this invention is to provide an air brake system with the means for replenishing or recharging the auxiliary reservoirs on the cars while retaining the brake cylinders in braking condition, that is, retaining in the brake cylinders the air which has been previously introduced therein to apply the brakes. Therefore, with this invention the engineer of a train can apply his brakes and have control of his train through his air brake system while recharging the auxiliary reservoirs.

With the braking systems heretofore in use it has been impossible for the engineer to recharge the auxiliary reservoirs without releasing the brakes on his train. Hence the engineer has been often unable to properly control his train while approaching a stop, or while going down a grade, particularly a variable grade; but with this invention he will have complete and sensitive control of the train at all times, for he can recharge his auxiliary reservoirs while his brakes are still applied.

Another feature of the invention is to provide the air brake system with means whereby the brakes on some of the cars may be released while the brakes on the other cars are retained, and the preferable arrangement is such that the brakes on every other car in the train can be released and the brakes on the remaining cars retained, and in conjunction with the features of the invention above described, the auxiliary reservoirs on the cars can be recharged while the brakes on every alternate car are still applied, and then the brakes on the cars which previously were released can be set and the brakes on the cars which are previously applied can be released. In other words, after the brakes have all been initially set, the engineer can alternately release and retain the brakes on the cars so as to avoid the excessive heating and the bursting of the wheels during a long period of braking, as, for instance, while on a long grade. It has been often necessary to stop the train in order to cool the wheels, but with this invention stopping the train becomes unnecessary because the brakes on a car may be alternately retained and released so that the wheels may be cooled while the train is continuing.

The full nature of the invention will be understood from the accompanying drawings and following description and claims.

Figure 2:
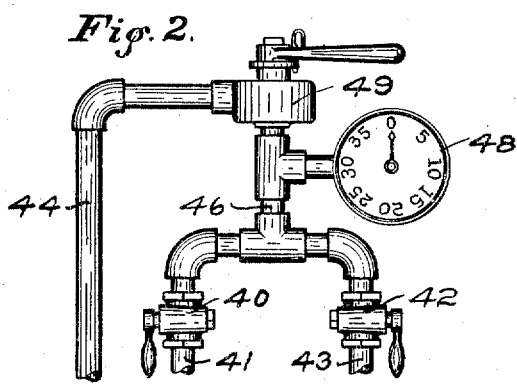
Figure 3:
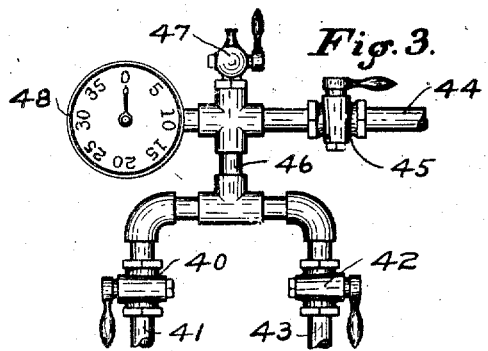
Figure 4:
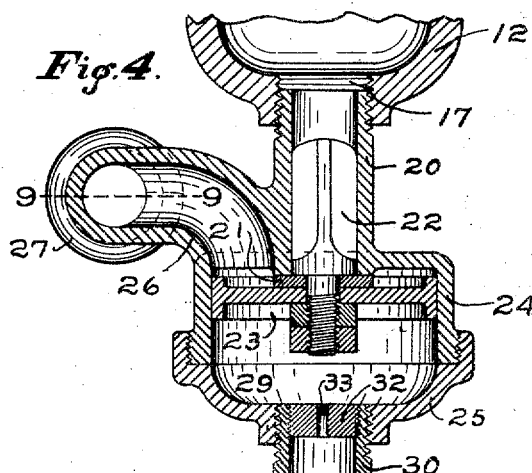
Figure 5:
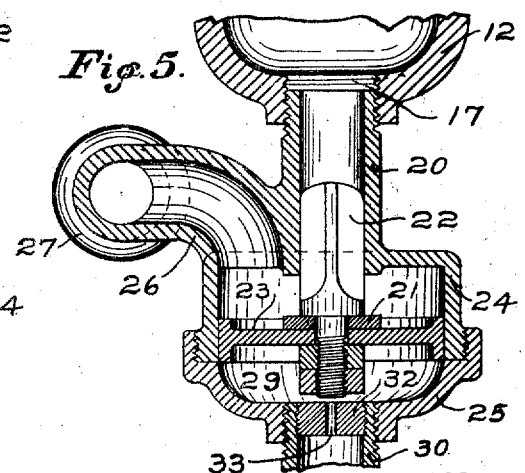

In the drawings, Figure 1 is a plan view, somewhat a diagram, of an air brake system including our invention, the brakes and other well known parts of air brake systems being omitted for clearness. Fig. 2 is an elevation of the valve mechanism in the engineer's cab and the connections therewith, the connections being partially broken away. Fig. 3 illustrates a modified form of said valve mechanism produced here for the purpose of making the explanation of the mechanism clearer. Fig. 4 is a central longitudinal section through the valve mechanism for controlling the escape of air from the exhaust port of the triple valve, the valve being shown in a closed position, and parts being broken away. Fig. 5 is the same as Fig. 4 with the valve in an open position.

In the first place, it must be understood that the regular air brake system heretofore familiar to those skilled in the art is to be employed in the air brake system herein set forth and including our improvements and inventions. All of such mechanism is not herein illustrated because the same is familiar to those skilled in the art, but there is shown herein a portion of the regular train line 10 and branch pipes 11 running therefrom to the triple valve 12, which is connected with the auxiliary reservoir 13, and that is associated with the brake cylinder 15 in the usual manner, and from the brake cylinder there is a push rod 16, which is operatively connected with the brakes by means not here shown.

It is understood that the triple valve controls the operation and exhaust of the brake cylinder, and the triple valve has an exhaust port 17, as shown in Figs. 4 and 5. Our invention is not limited to any particular construction of the foregoing parts, and it is contemplated that the entire train be equipped with said parts when our invention is used, just the same as trains heretofore have been equipped.

As shown in Figs. 4 and 5, there is a valve mechanism connected with the exhaust port 17 of the triple valve 12, said valve mechanism consisting of a pipe 20 connected with the exhaust port of the triple valve. The other end of said pipe is closed by a valve 21, which is mounted on a valve stem 22 angular in cross section and operating in the pipe 20, and there is a piston 23 connected with the other side of said valve for operating and controlling it. Said piston operates in a valve chamber 29 formed of a casing consisting of the member 24 and a cap 25 screwed thereon, and from the part 24 of said casing there is an exhaust pipe 26 leading to a horizontal discharge member 27 having an outlet at each end, see Fig. 4. This discharge member 27 extends parallel with the car. A pipe 30 leads from the valve chamber 29. The valve 21 is open and in the condition shown in Fig. 5 when the brake system is operating in the ordinary way without using our invention, and then the exhaust from the triple valve passes out by valve stem 22 and valve 21 through pipes 20 and 26 through the discharge 27.

The valve mechanism just described may be called for convenience the retainer valve mechanism, and the valve chamber 29 thereof is connected by a pipe 30 with a retainer valve line pipe 31, see Fig. 1. Within the pipe 30 there is a plug 32 with a reduced port 33, said plug being inserted in said pipe to reduce or avoid the hammer blow of the piston 23.

As shown in Fig. 1, there is a retainer valve line pipe 31 on each car, and there is also on each car an auxiliary pipe 34 parallel with the pipe 31 and of the same length and formation, but said pipe 34 on each car is not directly connected with the retainer valve mechanism. At each end of each pipe 31 and pipe 34 there is the usual hose coupling 35 and angle cock 36, excepting that the hose connections are arranged to be coupled in a diagonal order, as shown, so that the retainer valve pipe line 31 on one car is connected with the auxiliary pipe 34 on the next car or cars, and, conversely, the auxiliary pipe 34 on each car is connected with the retainer valve pipe line 31 on the adjacent car or cars. Therefore, considering the whole train system, there are provided two pipe lines in addition to the regular train line, and each additional pipe line consists of sections made up of pipes 31 and 34 alternating with each other throughout the entire length of the train, as is clear in Fig. 1. That is, the additional pipe line, of which pipe 31 in the first car shown in Fig. 1 is the first section, is composed first of said pipe 31, then of pipe 34 on the second car, pipe 31 on the third car, pipe 34 on the fourth car, and so on. One of these additional lines is controlled by the valve 40 in pipe 41 extending in the cab of the engine, and the other additional line is controlled by the valve 42 in pipe 43 in the cab of the engine, as illustrated in Fig. 1.

In the cab of the engine there is a pipe 44 connected with the main reservoir of the brake system, not shown herein, and which extends to the controlling valve 45. The pipe 44 is connected with both of the pipes 41 and 43 by an intermediate pipe 46. In pipe 46 there is a release valve 47, and there is also a pressure gage 48. The valve mechanism just described is shown in Figs. 1 and 3, and the particular showing therein is made chiefly for the purpose of clearness, because in actual installation of the invention the form shown in Fig. 2 would be preferable. In the form shown in Fig. 2 there is a three-way valve 49, which does the work and takes the place of the valves 45 and 47 shown in Figs. 1 and 3.

In operation, all the brakes in the train are first applied or set in the usual manner. Then, if the engineer desires to replenish or recharge the auxiliary reservoirs on the train without releasing the brakes and while all of them are still applied, he will open valve 45 and then both valves 40 and 42, and the effect will be to close every valve 21 in all the retaining valve mechanisms throughout the train, bringing them all to the condition shown in Fig. 4, so as to close the exhaust port from the brake cylinder through the triple valve and maintain the air pressure in the brake cylinder and thus retain the brakes in their set condition. With the brake cylinders thus retained in braking condition, the engineer can recharge his auxiliary reservoirs 13 throughout the entire system and increase the pressure therein, and he does this through the ordinary parts of the brake system heretofore employed. If the engineer finds it necessary or desirable to release some of the brakes in order to cool the wheels, or for any other purpose, he can open the valve 40, say, leaving the valve 42 closed, and thus he will operate the retaining valve 21 on every other car or every car to which that particular auxiliary line controlled by valve 40 extends. Then the engineer releases the brakes by means of his brake valve on the main train line, and that releases every brake in the train excepting those retained by the means just described. That is, in the illustration above referred to every brake connected with the line controlled by valve 40 would be released. While said additional line, as shown in Fig. 1, is alternating, still it need not alternate all the way through the train. All of the cars need not be coupled up diagonally, as shown in Fig. 1 unless it be so desired. The point is that some of the cars can be in one of the additional lines and the other cars connected with the other line. The connections between the pipes on different cars may be arranged diagonally, as shown in Fig. 1, or not as desired. After thus releasing some of the brakes as above explained, and while the other brakes are still retained, the engineer can recharge all the auxiliary reservoirs in the entire train. Then, if he wishes he can release the other set of brakes, which were retained in the preceding step in the operation, and if desired he can alternately retain the two sets of brakes so that the wheels on the cars will be kept cool. When it is desired to relieve the pressure in either one or both of the additional lines, the exhaust valve 47 is opened, and then the brake cylinder pressure will return all the retaining valves 21 to the normal open position shown in Fig. 5.

We are aware of the fact that the main train line is usually arranged under each car at one side of the center at one end of the car and crosses over to the other side of the center at the other end of the car, so that the ends of the main train line of each car will be equally distanced from the diagonally opposite corners of the car. In the drawings herein such arrangement has not been shown to avoid confusion. In actual construction the same arrangement should be made also with reference to the additional pipe lines formed of sections 31 and 34, but these also have not been shown crossed herein in order to avoid confusion in the understanding of the drawings and the operation of the device, as it would confuse and make the drawings very difficult to understand if all these pipe lines were crossed in the drawings on each car as they would be crossed in actual construction and as is well understood by those skilled in the art.

The invention is not necessarily limited to the particular arrangement or construction of the retainer valve mechanism or the exhaust valve mechanism herein set forth, as the same may be varied in many ways in construction and still accomplish the desired results herein described. Furthermore, the valves in said valve mechanisms and other parts therein have not been drawn to the exact scale such as would be adopted in the actual construction and operation of the apparatus. However, in the practical construction thereof, the diameters or sizes of the valves and pistons are so proportioned as to enable the large valve or piston at the low pressure exerted upon it by the engineer to overcome the greater pressure exerted against the small valve, and thus move the pistons and valves into their actuating or altered positions, as has been heretofore explained.

The word "engineer" as used herein and in the claims is meant to include all operators or persons who have control of the air brake mechanism in the same sense, substantially, as the engineer of a train drawn by a locomotive. Inasmuch as the invention applies equally well to electric cars and trains where the word "engineer" is not ordinarily used, but "motorman," or some other such word is employed, the word "engineer" herein is meant to include a motorman as well as any other operator in the same situation as an engineer.

We claim as our invention:

1. An air brake system including a train line running from and controlled in the cab of the engine, a plurality of brake cylinders, auxiliary reservoirs and triple valves connected with said train line, a retaining valve for closing the exhaust port of each triple valve, a plurality of additional air lines in communication with the main reservoir, one of said air lines leading to some of the retaining valves and the other air line or lines leading to other retaining valves, and valve mechanism for controlling said plurality of additional air lines, whereby air may be introduced through both of said additional air lines or either of them, as desired.

2. An air brake system including a train line running from and controlled in the cab of the engine, a plurality of brake cylinders, auxiliary reservoirs and triple valves connected with said train line, a retaining valve for closing the exhaust port of each triple valve, a plurality of additional air lines in communication with the main reservoir, one of said air lines leading to some of the retaining valves and the other air line or lines leading to other retaining valves, and valve mechanism for controlling each additional air line as well as both additional air lines.

3. An air brake system including a train line running from and controlled in the cab of the engine, a plurality of brake cylinders, auxiliary reservoirs and triple valves connected with said train line, a retaining valve for closing the exhaust port of each triple valve, a plurality of additional air lines in communication with the main reservoir, one of said air lines leading to some of the retaining valves and the other air line or lines leading to other retaining valves, valve mechanism for controlling each additional air line as well as both additional air lines, and a release valve in connection with said additional air lines.

4. An air brake system including a train line running from and controlled in the cab of the engine, a plurality of brake cylinders, auxiliary reservoirs and triple valves connected with said train line, a retaining valve for closing the exhaust port of each triple valve, a plurality of additional air lines extending throughout the series and in communication with the main reservoir, one of said additional air lines being connected with every alternate retaining valve and the other air line with every other retaining valve, and valve mechanism for admitting air under pressure to both or either of said additional air lines.

5. An air brake system for a train of cars and a locomotive including a train line controlled by the engineer in the locomotive, a brake cylinder, auxiliary reservoir and triple valve on each car and connected with said train line, a retaining valve for closing the exhaust port of each triple valve, a plurality of additional air lines extending throughout the length of the train and in communication with the air reservoir in the locomotive, one of said additional air lines being connected with the retaining valve on every alternate car and the other additional air line being connected with the retaining valves on the other alternate cars, and valve mechanism in the locomotive for controlling said additional air lines.

6. An air brake system for a train of cars and a locomotive including a train line extending from the locomotive, a brake cylinder, auxiliary reservoir and triple valve on each car and connected with said train line, a retaining valve for closing the exhaust port of each triple valve, a pipe extending for the length of each car connected with said valve, a second and parallel pipe on each car, hose couplings connecting the ends of each of said pipes on one car with the diagonally opposite ends of the other pipe on the adjacent cars so as to make two additional air lines, a pipe leading from each air line into the locomotive, and valve mechanism in the locomotive for controlling both additional air lines.

7. An air brake system including a train line, a brake cylinder, an auxiliary reservoir, a triple valve connected therewith and with the train line, a retaining valve for closing the exhaust port from the triple valve, an exhaust valve connected with the train line, and a single additional air line connected with both the retaining valve and exhaust valve and adapted to be controlled by the engineer for introducing air under pressure therethrough to said valves, and a gage connected with said additional air line, whereby the engineer will be enabled to operate the retaining valve without operating the exhaust valve.

In witness whereof, we have hereunto affixed our signatures in the presence of the witnesses herein named.

FRANK KOSIER.
THOMAS R. KOSIER.
THOMAS BEMIS.

Witnesses:
J. H. WELLS,
O. M. McLAUGHLIN.